United States Patent Office 3,199,209
Patented Aug. 10, 1965

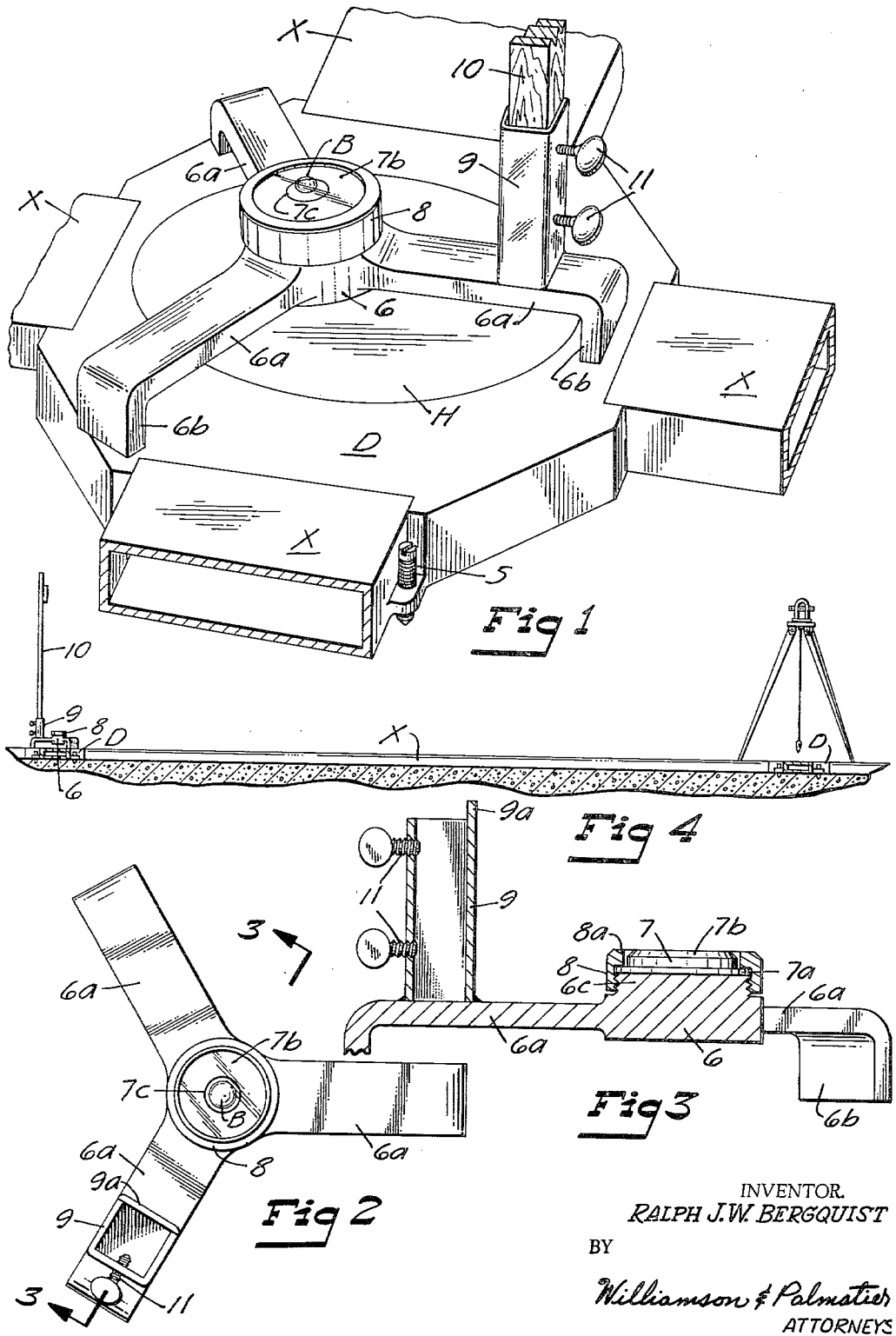

3,199,209
DEVICE FOR LEVELING AND SETTING TO GRADE ELEVATIONS, FLOOR DUCT BOXES AND THE LIKE
Ralph J. W. Bergquist, 6009 Newton Ave. S., Minneapolis, Minn.
Filed Mar. 19, 1962, Ser. No. 180,711
1 Claim. (Cl. 33—207)

This invention relates to an apparatus and system for accurately leveling and setting to grade elevation, structures which are embedded in concrete floors such as the duct boxes of electrical raceway or duct systems. Heretofore, to the best of my knowledge, in the leveling and setting to grade of duct boxes for concrete building construction, ordinary elongated carpenter's levels have been used to level the box through its several leveling screws and such a level had to be turned in both directions of the ducts, usually from five to six times before the box could be brought into a level position. Thereafter a separate stick was employed in conjunction with an ordinary surveyor's level and if the box was not then at the correct elevation, it had to be raised or lowered and of course, in changing elevation of the same, the leveling process had to be redone time and time again until the correct elevation and level was reached.

It is an object of my invention to provide an extremely simple but highly efficient combination of bubble level and stick, particularly adapted for leveling and setting to grade elevation the floor duct boxes of electrical raceway systems which are embedded in concrete floors, whereby the level may be supported upon the box or other structure to be leveled and set and will not have to be changed in position or turned throughout the leveling and setting process, and whereby a stick for cooperation with a surveyor's level will always be maintained precisely perpendicular to a planar surface on which the level is mounted.

I have discovered through extensive experience in concrete building construction where floor duct boxes and the like must be preleveled and set for grade elevation before the concrete is poured, that a tripod mounting of short height with precalibrated, horizontal and circular bubble level may be employed, supported upon the planar surface of the floor duct box or the like, to determine without changing of the position thereof, the precise leveling of the box through manipulation of the several leveling screws supplied.

My invention also includes the provision in one integral unit or system of an upstanding, rigidly mounted leveling-stick-socket predeterminately positioned with respect to the tripod mounting to have its axis and the rod contained herein disposed precisely perpendicular to a plane defined by the supporting or feet extremities of the level proper.

More specifically, my invention comprises a tripod mounting of short height, having a central mounting structure or hub in which is predeterminately secured a bubble chamber of circular form having liquid contained therein and a circular transparent cover or lens at the top thereof. The liquid and chamber provide a small circular bubble. My structure includes three legs, preferably disposed radially equidistant from the hub or mounting element and extending outwardly and downwardly and having feet for supporting surfaces disposed in a circle having a diameter between 8 and 16 inches. The legs, in operation, are rigidly interconnected with the mounting or hub member and in the form shown, terminate in downturned feet which have supporting extremities disposed in a common plane predetermined through calibration by grinding of the feet extremities so that the bubble will be in its predetermined central position of the bubble chamber when the feet are all supported upon a true horizontal surface. An upright stick socket is fixedly secured to the tripod mounting having its axis or center line disposed precisely normal to the common predetermined plane of the supporting surfaces of the feet.

Referring now to the accompanying drawings:

FIG. 1 is a perspective view showing an embodiment of my invention applied for leveling and setting to grade elevations to the top of a conventional duct box of an electrical duct system, portions of the communicating ducts being broken away as well as the vertical stick;

FIG. 2 is a top plan view of my leveling and grade setting device or apparatus;

FIG. 3 is a vertical section taken on the line 3—3 of FIG. 2; and

FIG. 4 is a diagrammatic view illustrating on a much smaller scale, the use of my structure with a surveyor's level or transit for determining the settings to grade as well as leveling of such devices as duct or junction boxes in concrete building operations.

In the embodiment of my invention illustrated, a low tripod structure is employed comprising a central mounting or hub member 6 having as shown, three rigidly and if desired integrally constructed legs 6a which extend outwardly and generally radially from the mounting member, and then downwardly to provide downturned supporting feet 6b which may be integrally formed or adjustably secured to the legs 6a. It will be understood that the legs 6a may be hingedly but in operation rigidly connected with the mounting member 6 to provide for collapsing of the structure if desired.

Mounting member 6 has an upstanding externally threaded boss 6c as shown, which provides an upper horizontal shoulder for receiving the flanged lower edge 7a of a bubble-forming chamber 7. The bubble-forming chamber 7 as well as the mounting 6 and legs 6a are preferably constructed of rigid, non-corrosive metal. Bubble-forming chamber 7 is circular in shape and has sealed to the top thereof a transparent cover or lens 7b, which completes the chamber and seals in the appropriate liquid which fills the chamber to an extent as is well known in the art to leave a circular air bubble B. An internally threaded cap ring 8 having an inturned flange 8a clamps the bubble chamber to the upper horizontal surface of the boss 6c and if desired, a gasket (not shown) may be interposed between the two. The transparent cover or lens 7b is preferably provided with a small circular marking 7c disposed axially thereof for readily reading and interpreting the precise position of the bubble when the tripod device is at a true level.

It will be understood that in the production and manufacture of my device and apparatus accurate calibration of the structure is essential through grinding or other adjustment of the supporting surfaces of feet 6b until the bubble B is disposed precisely in predetermined position with the supporting feet disposed upon a true horizontal planar surface.

My structure and system includes an upstanding stick-retaining socket 9 which may be in any way rigidly and predeterminately secured to the central mounting 6, and which as shown is eccentrically disposed thereof, being welded or otherwise rigidly secured to one of the three radial legs 6a and with the axis of said socket 9 disposed in true perpendicular relation with the common plane defined by the supporting surfaces of the three supporting feet 6b of the structure. Socket 9 as shown is rectangular in cross section for receiving a conventional gauge stick 10 which may be removably and rigidly secured to the socket by suitable means such as set screws 11 having as shown flatted external finger grips. The socket 9 preferably is provided at one of its upper edges with a projecting indicator lip 9a which is adapted to indicate a precise dimensional relationship between the upper edge thereof and the supporting plane of the three feet 6b of the tripod legs.

In FIG. 1 an embodiment of my invention is illustrated operatively applied to the top of a conventional type of duct or junction box D for an electric raceway or duct system. The top of the duct box D and hand hold plate H are smooth surfaced and flush so that floor covering material may be laid directly upon them, after the raceway system and boxes are embedded in concrete. Duct openings are provided so that the ducts are also flush with the top of box D. The ducts X interconnect boxes in the raceway system. The box is provided at four corners with the usual leveling screws S by which the box may be adjusted for leveling upon its base.

With my improved structure and system the precalibrated tripod mounting may be supported at random on the flat top of the duct box and because of a three-point support the bubble level will truly index perfect horizontal positioning of the flat plate on which the three feet 6b are mounted. These feet extend in preferably equidistant spaced relation circumferentially on the circumference of a circle of for example, from 12 to 16 inches.

The surveyor's stick 10 (broken off in the drawings) is detachably affixed within the upright socket 9 and the apparatus is then positioned for precisely leveling the box and also determining grade elevation thereof. The box is first leveled by adjusting the several leveling screws S until the bubble is disposed centrally within the indicating circle 7c and then the grade elevation may be determined by using an ordinary surveyor's level. The indicator lip 9a and the inner upraised flange of socket 9 are disposed a predetermined distance above the common plane upon which the feet of the tripod mounting is supported. Thus, it may be utilized with graduations on the stick 10 to determine elevation or lowering of the duct box as desired in the contemplated building plans.

In adjusting the leveling screws of the duct box D my structure remains in the originally disposed position and no shifting thereof is needed but a very quick and accurate leveling may be readily attained. With the proper positioning of the duct boxes on a concrete building floor the ducts may be readily interconnected and the entire raceway system embedded in the concrete.

From the foregoing description it will be seen that I have provided a simple but highly efficient structure which may be economically manufactured and sold to the trade at low cost, for greatly simplifying the leveling of objects and devices such as duct boxes in building construction. My unitary structure brings about the elimination of numerous determinations of levels through shifting of carpenter's levels in the adjustment of leveling screws.

My structure further, in one unit supplies an accurate stick support wherein the axis of the stick for sighting upon is always normal or perpendicular to the surface upon which the three feet 6b of the tripod mounting is supported.

It will of course be understood that various changes may be made in the form, details and arrangement of parts, without departing from the general scope of my invention.

What is claimed is:

A combination, simplified bubble level and stick socket for levelling and setting to grade, floor duct boxes and the like having in combination precisely the following components:

a central mounting of hub form having an upwardly extending boss externally threaded, a substantially circular bubble chamber with liquid contained therein having a transparent top to provide for sight location of said bubble, said bubble chamber having a base supported upon and substantially fitting the top of said boss, an internally threaded cap ring engaging the periphery of said boss and rigidly securing said bubble chamber thereto, said mounting having integrally formed therewith precisely three outwardly and radially extending legs in equiangular relationship secured thereto, all of said legs terminating in downturned narrow supporting feet having supporting extremities disposed in a common plane, the medial portions of said legs extending substantially horizontally, a rigid, upstanding stick socket affixed to the medial portions of one of said legs and having a vertical center line disposed perpendicularly to the plane defined by the extremities of said supporting feet and said socket having an indexing upper lip at one edge thereof disposed a predetermined distance above said plane, and the center or axis of said bubble chamber being disposed truly perpendicular to said plane.

References Cited by the Examiner

UNITED STATES PATENTS

| 1,071,430 | 8/13 | Keen | 33—207 X |
| 1,853,558 | 4/32 | Fullman | 33—207 X |
| 1,898,367 | 2/33 | Heinze | 33—212.2 |
| 2,169,533 | 8/39 | Kasten | 33—74 |
| 2,627,665 | 2/53 | Straud | 33—207 |
| 2,843,347 | 7/58 | King | 33—74 X |

FOREIGN PATENTS

| 470,993 | 4/14 | France. | |

ISAAC LISANN, *Primary Examiner.*